United States Patent
Ohtomo et al.

[11] Patent Number: 5,909,455
[45] Date of Patent: Jun. 1, 1999

[54] ROTATING LASER BEAM IRRADIATING APPARATUS

[75] Inventors: Fumio Ohtomo; Hiroshi Koizumi; Masayuki Momiuchi; Masahiro Ohishi; Yoshiaki Goto, all of Tokyo, Japan

[73] Assignee: Kabushiki Kaisha TOPCON, Tokyo, Japan

[21] Appl. No.: 09/019,285

[22] Filed: Feb. 5, 1998

[30] Foreign Application Priority Data

Feb. 9, 1997 [JP] Japan .................................. 9-040153

[51] Int. Cl.⁶ ........................................ H01S 3/10
[52] U.S. Cl. ................................................ 372/9
[58] Field of Search .................... 372/9, 22, 25, 372/75; 219/121 LW

[56] References Cited

U.S. PATENT DOCUMENTS 4,258,246  3/1981  Karube et al. ...................... 219/121
5,121,160  6/1992  Sano et al. ........................ 250/492.3
5,825,798  10/1998  Momiuchi et al. .................. 372/22

*Primary Examiner*—Leon Scott, Jr.
*Attorney, Agent, or Firm*—Baker & Botts, L.L.P.

[57] ABSTRACT

The present invention relates to a rotating laser beam irradiating apparatus, and more particularly to a rotating laser beam irradiating apparatus which, by synchronizing an emission timing of a pulse laser with a rotation of an irradiating means, makes it possible to describe intermittent dot-shaped marks, to tremendously increase a visual recognition distance, and to enlarge a work area; wherein a pulse driving means drives a pulse laser light source, and an irradiating means irradiates an irradiated object with a pulse laser light beam from the pulse laser light source, and a rotation driving means rotates the irradiating means, and a rotation detecting means detects the rotation of the irradiating means, and an arithmetic processing means, in accordance with a driving timing from the pulse driving means and a detection signal from the rotation detecting means, controls the rotation driving means to synchronize an emission timing of the pulse laser with the rotation of the irradiating means.

6 Claims, 10 Drawing Sheets

$\tau_{FL} < T - \tau$ $\tau_{FL} > T - \tau$ $Tp-on < \phi / (R * \omega)$

ROTATING LASER BEAM IRRADIATING APPARATUS

BACKGROUND OF THE INVENTION

The present invention relates to a rotating laser beam irradiating apparatus, and more particularly to a rotating laser beam irradiating apparatus which, by synchronizing an emission timing of a pulse laser with a rotation of an irradiating means, makes it possible to describe intermittent dot-shaped marks, to tremendously increase a visual recognition distance, and to enlarge a work area.

Widespread up to now in a work area such as a construction site has been a constructing process of rotating a laser light beam to form a rotating laser beam plane, and of then performing the construction using the reference plane thus produced A red-colored laser diode, reflecting recent technological advances in a semiconductor laser, is employed in the rotating laser beam irradiating apparatus for forming the rotating laser beam plane. The rotating laser beam irradiating apparatus using the red-colored laser diode is battery-operable and easy to handle, thus being widely used in a construction work area.

For example, a prior art rotating laser beam irradiating apparatus comprises a laser light projector and a laser light irradiating unit which rotates around an optical axis of the laser light projector so as to irradiate with a laser light deflected by 90 degrees to the optical axis of the laser light projector. The prior art rotating laser beam irradiating apparatus, by rotating the laser light irradiating unit, makes it possible to form the reference plane or to provide a reference line on an object such as a wall surface.

However, the prior art rotating laser beam irradiating apparatus using the red-colored laser diode had a limit in an output of the semiconductor laser, and in addition had a restriction to an irradiating output of the laser in order to assure safety for the eyes of a worker. This resulted in a problem that, in a comparatively bright work area and at a position a little away from the rotating laser beam irradiating apparatus, it becomes impossible to visually recognize the rotating laser beam plane.

It can be considered, in order to overcome the restriction to the laser irradiating output, to employ a green laser to which a spectral luminous efficiency of the human eye is high.

However, even if the green laser is employed instead of the red laser, the following problem emerged especially when increasing the laser irradiating output: The laser beam emitted was-too bright for the eyes of a worker, which made it impossible to assure the safety, to realize a tremendous increase in the visual recognition distance, and to enlarge the work area.

Moreover, employed as a means for generating the green laser can be a solid-state laser generating apparatus using a secondary higher harmonics generator being widespread in recent years. The solid-state laser generating apparatus is able to generate a comparatively high output of green laser, but the power consumption thereof was great and the generating apparatus was found to be difficult to drive continuously for a long time by the battery-operation.

SUMMARY OF THE INVENTION

The present invention relates to a rotating laser beam irradiating apparatus in which a pulse driving means drives a pulse laser light source, and an irradiating means irradiates an irradiated object with a pulse laser light beam from the pulse laser light source, and a rotation driving means rotates the irradiating means, and a rotation detecting means detects the rotation of the irradiating means, and an arithmetic processing means, in accordance with a driving timing from the pulse driving means and a detection signal from the rotation detecting means, controls the rotation driving means to synchronize an emission timing of the pulse laser with the rotation of the irradiating means.

BRIEF DESCRIPTION OF THE DRAWINGS

The drawings show an embodiment of the present invention, wherein.

DETAILED DESCRIPTION OF THE PREFERRED EMBODIMENTS

Embodiment

A preferred embodiment of the present invention will be described in accordance with the accompanying drawings.

Figure 1:
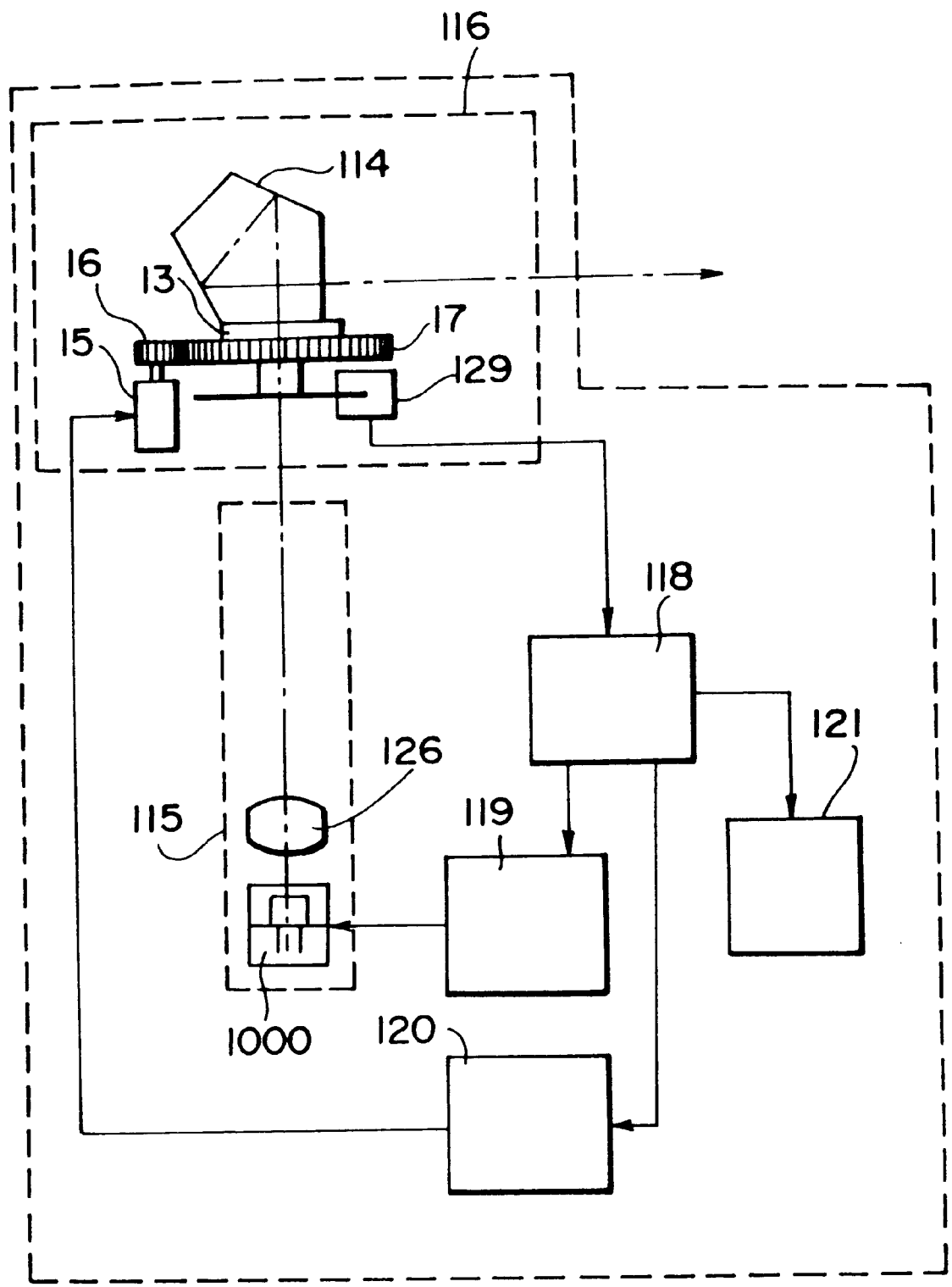
FIG. 1 is a diagram for describing a configuration of a rotating laser beam irradiating apparatus according to an embodiment of the present invention.
Figure 2:
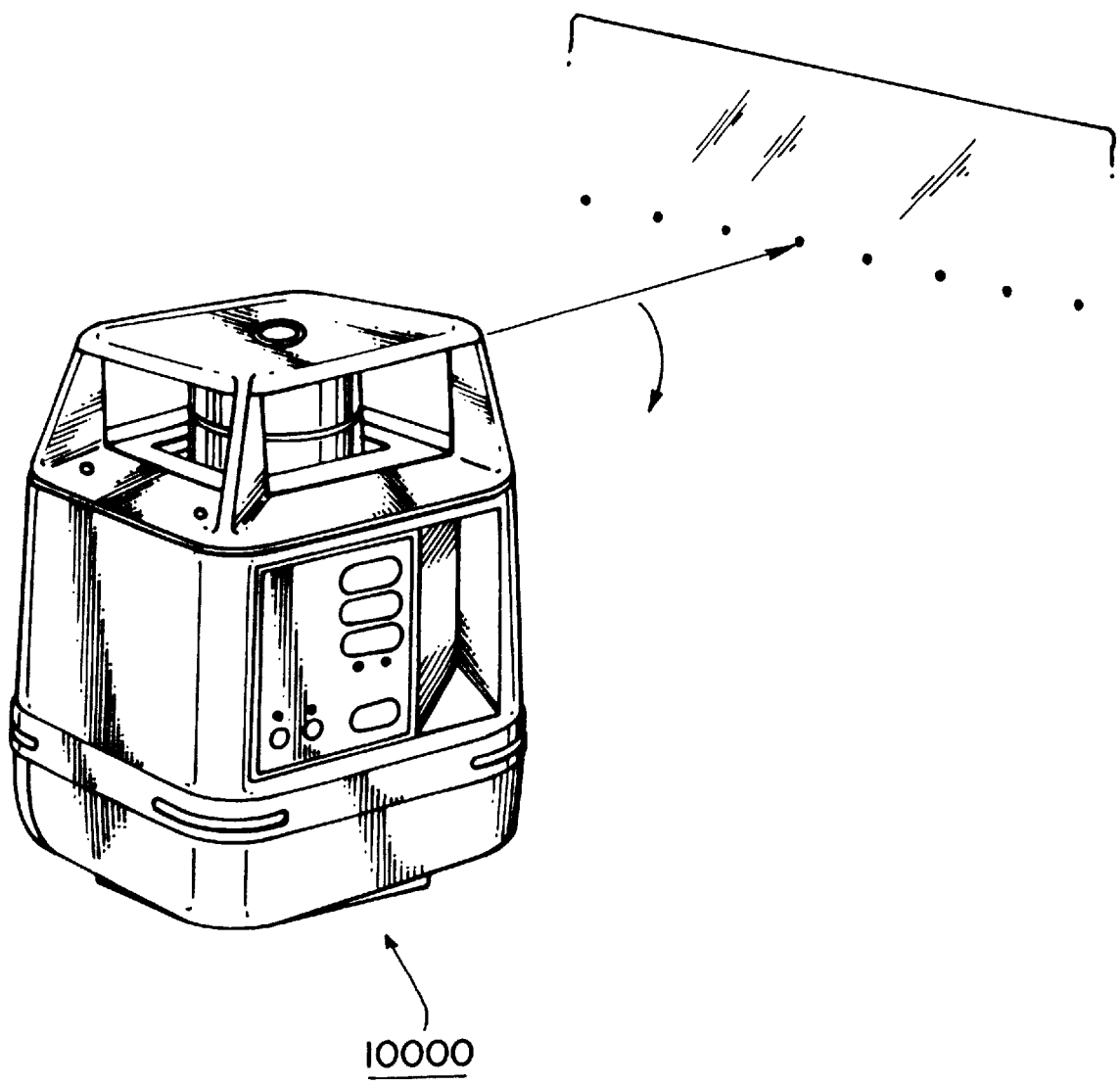
FIG. 2 is a perspective view of the rotating laser beam irradiating apparatus according to the present embodiment.

FIG. 1 shows a configuration of a rotating laser beam irradiating apparatus 10000 according to the present embodiment, and FIG. 2 shows a perspective view of the rotating laser beam irradiating apparatus 10000.

Described below is an optical and electrical configuration of the rotating laser beam irradiating apparatus 10000.

As shown in FIG. 1, the rotating laser beam irradiating apparatus 10000 comprises a light emitting unit 115, a rotating unit 116, a control unit (CPU) 118, a laser driving unit 119, a motor driving unit 120, and a display unit 121.

The control unit (CPU) 118 corresponds to the arithmetic processing means.

Next, the description will be given below concerning the light emitting unit 115.

The light emitting unit 115 according to the present embodiment is configured by a laser beam emitting apparatus 1000 and a collimator lens 126. A laser light launched out from the laser beam emitting apparatus 1000 is converted into a collimated light beam by the collimator lens 126, and the collimated light beam is launched into the rotating unit 116 situated upwards.

Incidentally, the laser beam emitting apparatus 1000 corresponds to the pulse laser light source.

The rotating unit 116 is a unit for scanning the laser light introduced from the light emitting unit 115 so as to deflect the laser light by 90 degrees and for launching out the deflected laser light. The comprises a penta prism 114, a rotation supporter 13, a driving gear 16, a driven gear 17, a scanning motor 15, and an encoder 129. Also, the rotating unit 116 corresponds to the irradiating means.

The penta prism 114 is a unit for deflecting by 90 degrees the laser light introduced from the light emitting unit 115. The penta prism 114, by reflecting the laser light twice inside the penta prism 114, enables the laser light to be deflected by 90 degrees.

The rotation supporter 13 is a unit for rotating the penta prism 114, and is provided with the driven gear 17. The rotation supporter 13 is able to rotate and scan, in a substantially horizontal direction, the laser light introduced from the light emitting unit 115.

The scanning motor 15 is a driving source for rotating the penta prism 114 through the rotation supporter 13. Formed on the scanning motor 15 is the driving gear 16. The driving gear 16 is engaged with the driven gear 17, and a rotating driving force by the driving gear 16 is transmitted to the driven gear 17, thus making it possible to rotate the penta prism 114 through the rotation supporter 13. Additionally, the scanning motor 15, the driving gear 16, and the driven gear 17 correspond to the rotation driving means.

Also, an encoder 129 is attached to the rotation supporter 13, thus making it possible to detect a state in which the rotation supporter 13 is rotating. A detection signal from the encoder 129 is configured to be inputted into the control unit 118. The encoder 129 corresponds to the rotation detecting means, and in the present embodiment, the encoder 129 is able to detect an irradiating direction of a laser light, too.

Figure 3:
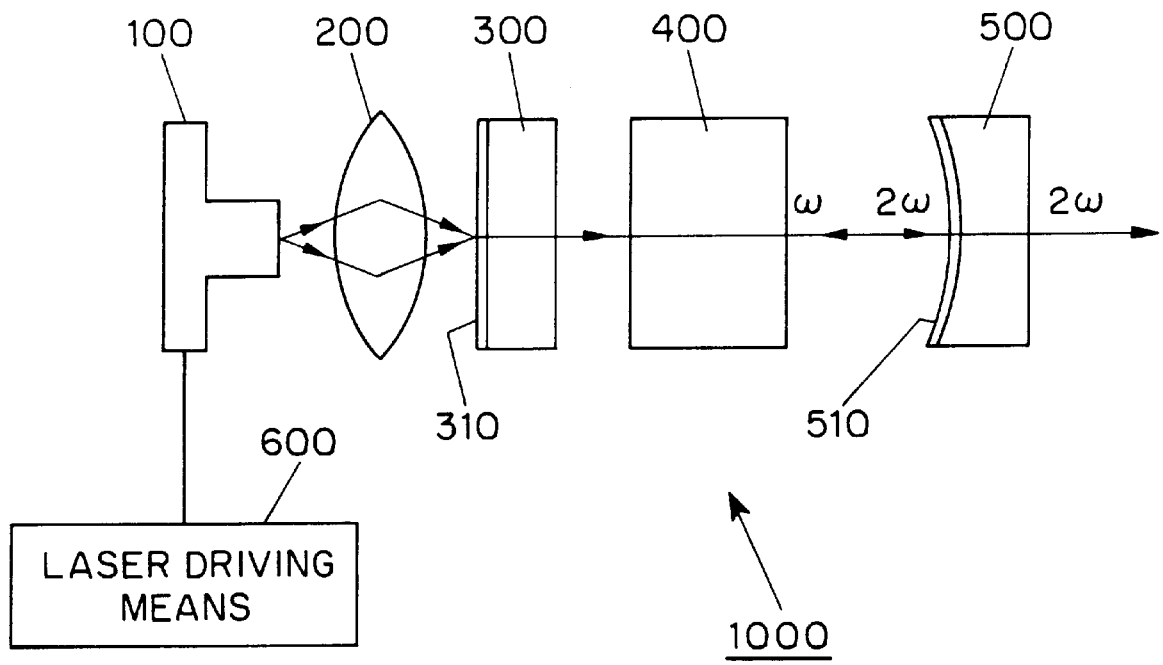
FIG. 3 is a diagram for explaining a laser beam emitting apparatus according to the present embodiment.

FIG. 3 shows a laser beam emitting apparatus 1000 according to the present embodiment, which comprises a laser light source 100, a condenser lens 200, a laser crystal 300, a non-linear optical medium 400, an output mirror 500 and a laser driving means 600.

The laser light source 100 is used to generate a laser beam. In the present embodiment, a semiconductor laser is used as the laser light source 100. In the present embodiment, the laser light source 100 functions as a pumping light generator for generating a fundamental wave. Further, the laser driving means 600 is used to drive the laser light source 100. In the present embodiment, the laser driving means 600 is capable of pulse-driving the laser light source 100.

The laser crystal 300 is a medium having a negative temperature and is used to amplify light. YAG (Yttrium Aluminum Garnet) doped with $Nd^{3+}$ ions, or the like is adopted as the laser crystal 300.

A first dielectric reflecting film 310 is formed on the laser light source 100 side of the laser crystal 300.

The output mirror 500 is configured so as to be opposed to the laser crystal 300 with the first dielectric reflecting film 310 formed thereon. The laser crystal 300 side of the output mirror 500 is processed into a shape of a concave spherical mirror having a suitable radius so that a second dielectric reflecting film 510 is formed on the output mirror 500.

The non-linear optical medium 400 is inserted into an optical resonator composed of the first dielectric reflecting film 310 of the laser crystal 300 and the output mirror 500.

When an electric field is applied to a substance, electric polarization is produced. When the electric field is low, the electric polarization is proportional to the electric field. However, the proportionality between the electric field and the polarization is unbalanced in the case of powerful coherent light such as a laser beam. Thus, a non-linear polarized component proportional to the square or cube of the electric field comes about excellently.

Coupling occurs between optical waves having frequencies different from each other due to the non-linear polarized component, so that harmonics doubling the frequency of the optical wave are produced.

Since the non-linear optical medium 400 is inserted into the optical resonator composed of the laser crystal 300 and the output mirror 500, it is called "internal type SHG". Since a converted output is proportional to the square of optical power of the fundamental wave, an effect can be brought about in that a large optical intensity in the optical resonator can be directly used.

Figure 4:
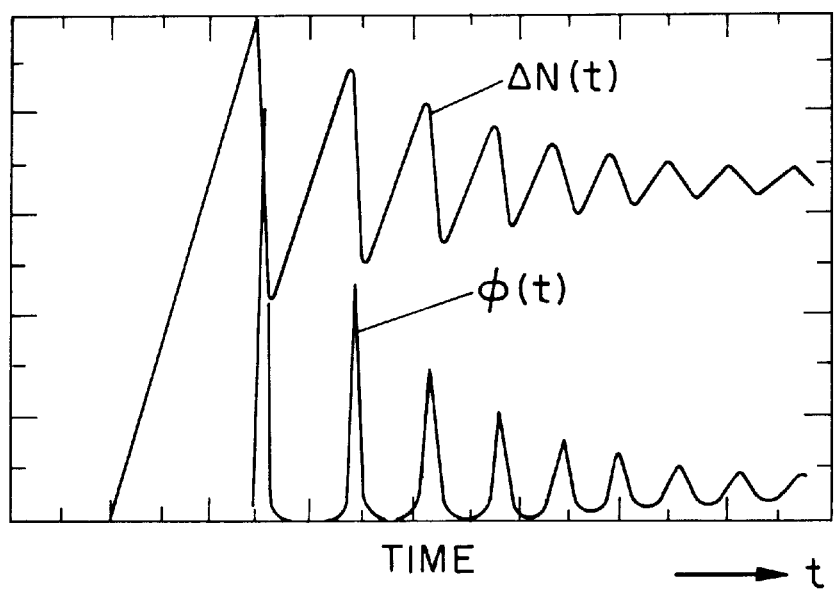
FIG. 4 is a diagram showing the relationship between a population inversion and the intensity of light at the time of relaxation vibrations of a semiconductor laser.

FIG. 4 shows the relationship between an inverted population and the intensity of light at the time of relaxation vibrations of a commonly-used laser light source. A delta N(t) shown in FIG. 4 indicates the inverted population (gain), $\phi(t)$ indicates the intensity of light, and the abscissa indicates the elapse of time.

It can be understood from FIG. 4 that when the inverted population reaches the maximum, the initial spike (i.e., first pulse) rises so as to produce the maximum light intensity.

Figure 5A:
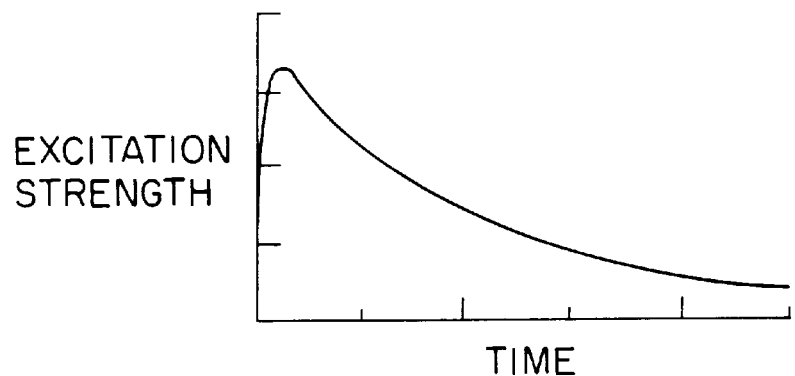
FIG. 5(a) is a diagram schematically showing a gain switch and shows the relationship between the time and the intensity of pumping.
Figure 5B:
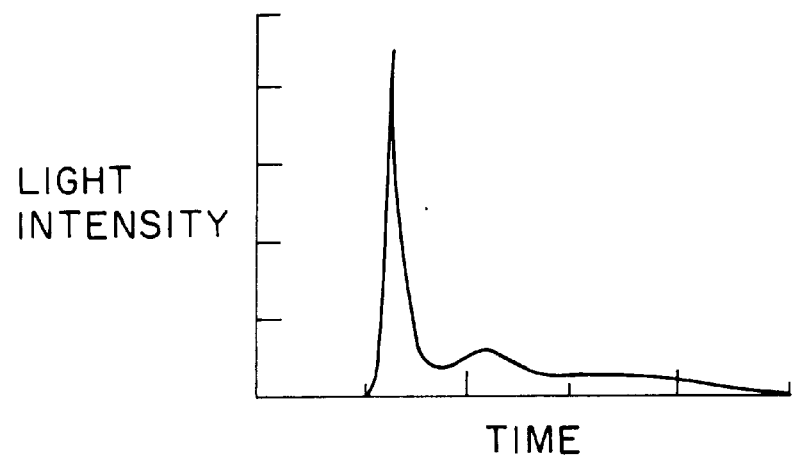
FIG. 5(b) is a diagram schematically illustrating a gain switch and shows the relationship between the time and the intensity of light.
Figure 5C:
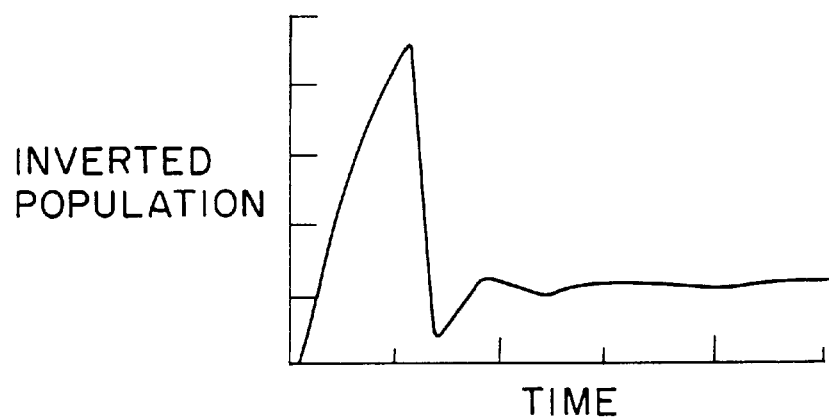
FIG. 5(c) is a diagram schematically illustrating a gain switch and shows the relationship between the time and a population inversion.

Further, FIGS. 5(a), 5(b) and 5(c) typically show gain switches, respectively, wherein FIG. 5(a) is a diagram showing the relationship between the time and the intensity of pumping, FIG. 5(b) is a diagram showing the relationship between the time and the intensity of light, and FIG. 5(c) is a diagram illustrating the relationship between the time and the inverted population.

If driving power expressed in a continuous wave is supplied to a semiconductor laser, then the maximum light intensity is produced in response to the first pulse. Thereafter, since the light intensity is reduced so as to converge on a predetermined light intensity, the use of the first pulse alone allows the most efficient extraction of light.

A further description will be made of the case in which driving power expressed in a continuous pulse is supplied to a semiconductor laser, referring to FIGS. 6(a) and 6(b).

Incidentally, a drive pulse for driving the semiconductor laser and an optical pulse outputted from the semiconductor laser are substantially identical in period and pulse width to each other.

Figure 6A:
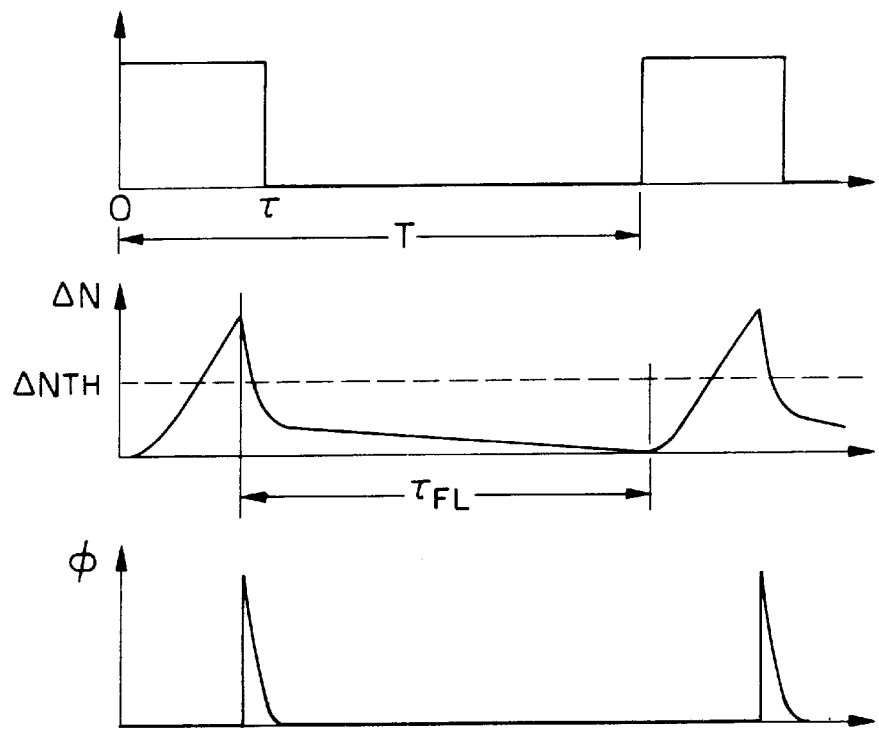
FIG. 6(a) is a diagram for describing the relationship in which a period T of a continuous pulse supplied to a semiconductor laser satisfies a condition, $\tau_{FL} < T-\tau$.

FIG. 6(a) is a diagram showing the relationship in which a period T of the continuous pulse supplied to the semiconductor laser satisfies the condition that $\tau_{FL} < T - \tau$. In the present expression, $\tau_{FL}$ indicates the life of fluorescence, and $\tau$ indicates the width of the pulse.

Figure 10A:
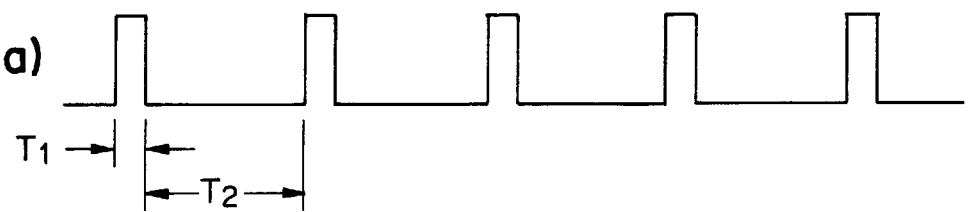
FIG. 10(a) is a diagram for describing a second driving signal.
Figure 10B:
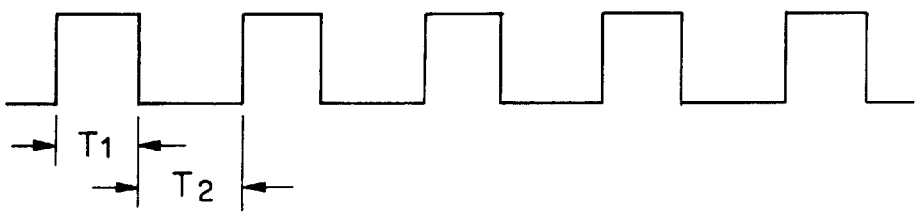
FIG. 10(b) is a diagram for describing a second driving signal.

In contrast to FIG. 10(a), FIG. 10(b) is a diagram showing the relationship in which the period T of the continuous pulse supplied to the semiconductor laser satisfies the condition that $\tau_{FL} > T - \tau$.

Figure 6B:
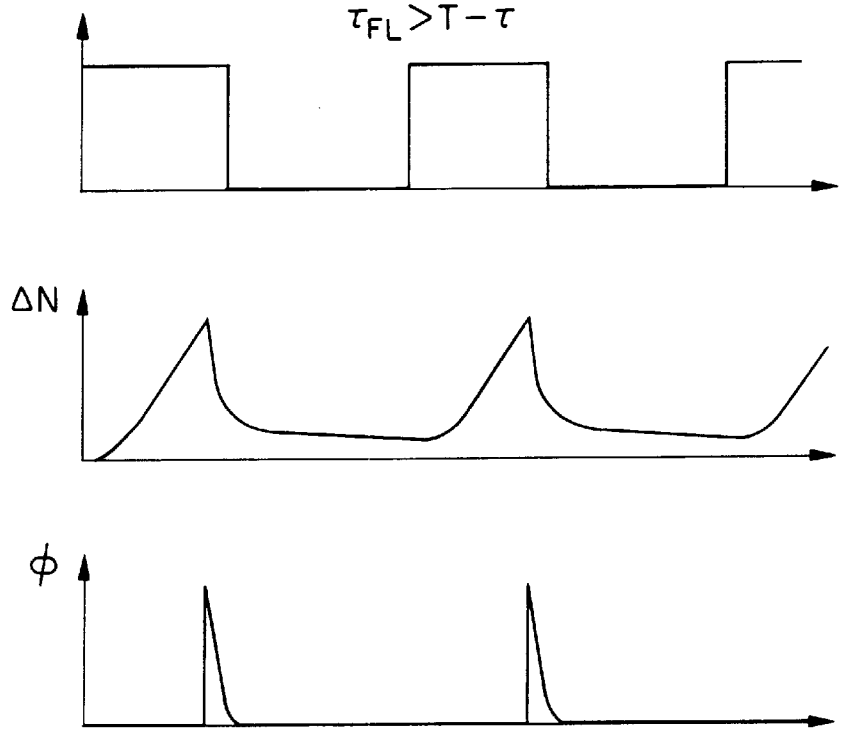
FIG. 6(b) is a diagram for describing the relationship in which the period T of the continuous pulse supplied to the semiconductor laser satisfies a condition, $\tau_{FL} > T-\tau$.

It can be understood from FIG. 6(b) that a new inverted population is added to the remaining inverted population by applying the next pulse to the semiconductor laser during $\tau_{FL}$ (life of fluorescence), whereby only light having the maximum light intensity can be effectively produced on a continual basis.

Figure 7:
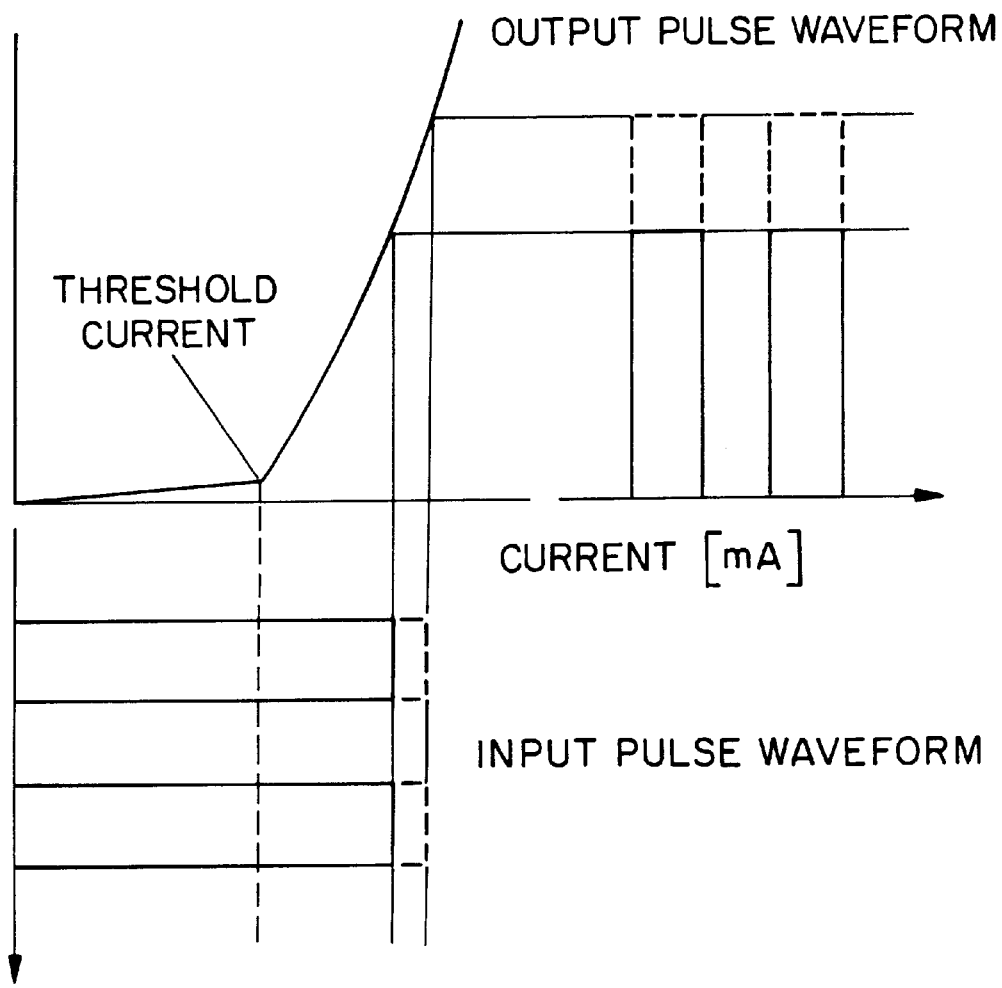
FIG. 7 is a diagram for describing the relationship between an input pulse of a laser light source and the quantity of light emitted from the laser beam emitting apparatus.

The relationship between an input pulse of the laser light source 100 and the quantity of light emitted from the laser beam emitting apparatus 1000 will further be explained based on FIG. 7.

When the input pulse of the laser light source 100 exceeds a threshold current, the quantity of light emitted from the laser beam emitting apparatus 1000 increases nonlinearly. Thus, if the peak value of the input pulse current supplied to the laser light source 100 is defined as a rated value of the laser light source 100 and the duty ratio and period of the input pulse are controlled, then the quantity of a laser beam or light can be varied in a state in which the laser has been oscillated with most efficiency.

Figure 8:
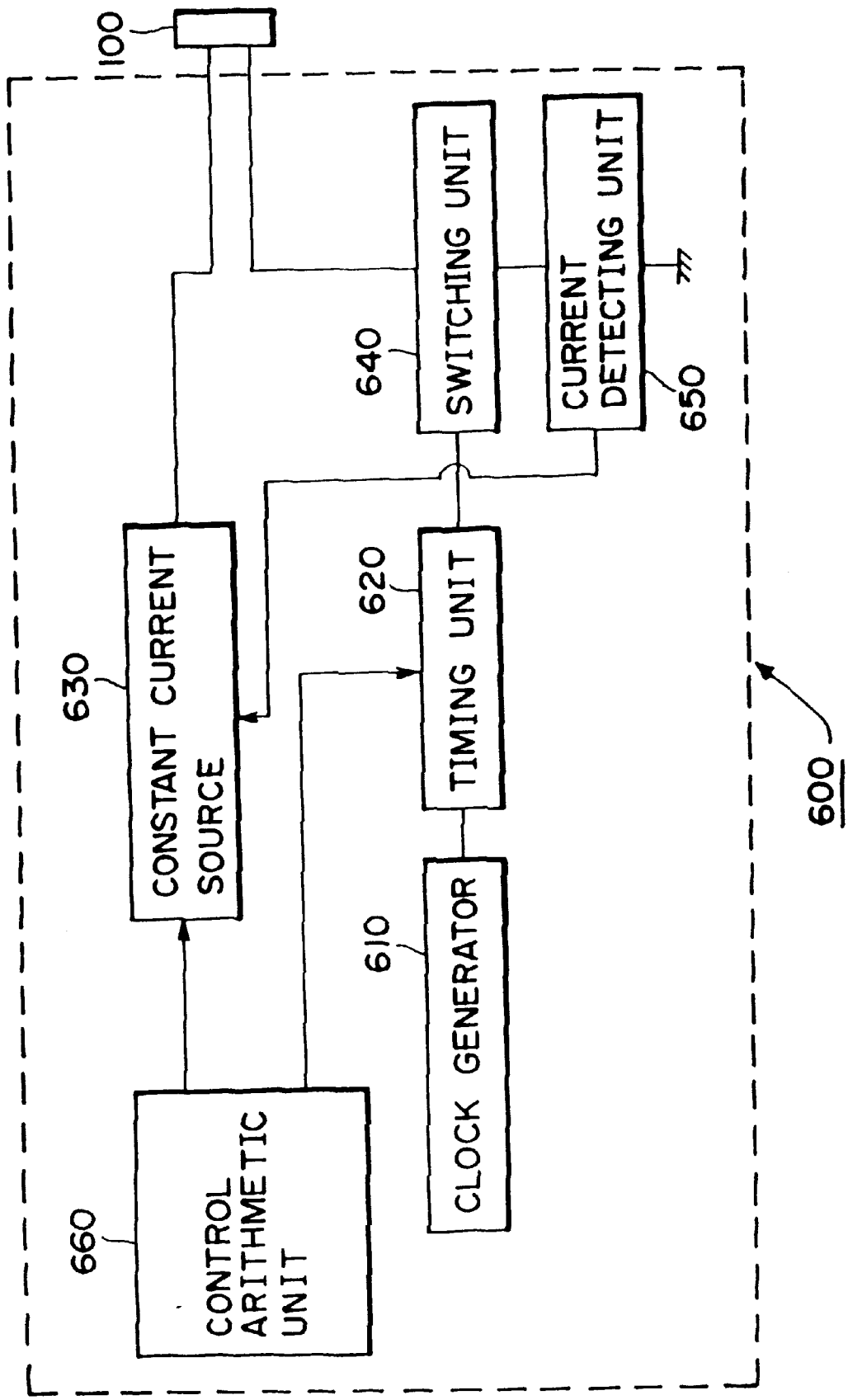
FIG. 8 is a diagram for illustrating an electrical configuration of a laser driving means.

The laser driving means 600 employed in the present embodiment will next be described in detail based on FIG. 8.

The laser driving means 600 comprises a clock generator 610, a timing unit 620, a constant current source 630, a switching unit 640, a current detecting unit 650 and a control arithmetic unit 660.

The clock generator 610 is an oscillator for generating a clock used as the reference.

The timing unit 620 is used to set the time and period required for the laser light source 100 to emit light, based on the reference clock generated from the clock generator 610.

The constant current source 630 is used to supply a rated current to the laser light source 100 and to set a current used up by the laser light source 100, which is detected by the current detecting unit 650, to the rated current at all times.

The switching unit 640 is used to switch the current supplied to the laser light source 100 by switching, based on a signal outputted from the timing unit 620.

The current detecting unit 650 is used to detect a current flowing in the laser light source 100. Any current detecting means may by adopted if ones capable of detecting the current flowing in the laser light source 100 are used.

The control arithmetic unit 660 is used to send a control signal to the timing unit 620 and the constant current source 630 and thereby supply a desired drive signal to the laser light source 100.

The laser driving means 600 of the laser beam emitting apparatus 1000 according to the present embodiment constructed as described above can form a drive signal to be sent to the laser light source 100, based on the control signal outputted from the control arithmetic unit 660.

The drive signal produced by the laser driving means 600 will next be described in detail.

[First drive signal]

A first drive signal is used to control and drive the laser light source 100 under the control of the period of a pulse thereof to thereby adjust the quantity of light emitted from the laser beam emitting apparatus 1000.

Figure 9A:
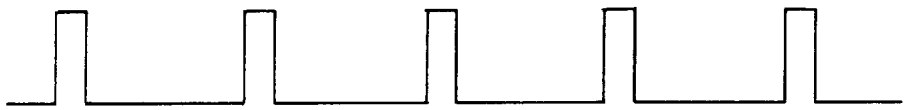
FIG. 9(a) is a diagram for describing a first driving signal.
Figure 9B:
FIG. 9(b) is a diagram for describing a first driving signal.

FIGS. 9(a) and 9(b) respectively show a first drive signal produced by the laser driving means 600. In the fist drive signal, the period of the pulse thereof is varied. Namely, when it is desired to increase the quality of light emitted from the laser beam emitting apparatus 1000, the cycle or period of the pulse thereof is rendered short and an effective value of the drive signal supplied to the laser light source 100 is increased, as shown in FIG. 9(a). As a result, the quantity of light emitted from the laser beam emitting apparatus 1000 increases.

On the other hand, when it is desired to reduce the quantity of light emitted from the laser beam emitting apparatus 1000, the period of the pulse of the drive signal is rendered long and the effective value of the drive signal supplied to the laser light source 100 is reduced, as shown in FIG. 9(b). As a result, the quantity of light emitted from the laser beam emitting apparatus 1000 is decrease.

Thus, the laser driving means 600 can change the drive signal supplied to the laser light source 100 to adjust the quantity of light emitted from the laser beam emitting apparatus 1000.

Incidentally, the period of the pulse of the first drive signal is a few 100 KHz but may suitably be set.

[Second drive signal]

A second drive signal is used to control and drive the laser light source 100 under the control of the duty ratio of a pulse thereof to thereby adjust the quantity of light emitted from the laser beam emitting apparatus 1000.

FIG. 10(a) and 10(b) respectively show a second drive signal formed by the laser driving means 600, in which the duty ratio of a pulse thereof is varied in a state in which the cycle or period of the pulse remains unchanged. Namely, the duty ratio corresponding to the ratio between a time ($T_1$) required to hold ON the drive signal supplied to the laser light source 100 and a time ($T_2$) required to hold OFF the drive signal is changed.

Namely, when it is desired to increase the quantity of light emitted from the laser beam emitting apparatus 1000, $(T_1)/(T_1+T_2)$ is increased and the time required to hold ON the drive signal supplied to the laser light source 100 is rendered long, as shown in FIG. 10(a), whereby the quantity of light emitted from the laser beam emitting apparatus 1000 can be increased.

On the other hand, when it is desired to decrease the quantity of light emitted from the laser beam emitting apparatus 1000, $(T_1)/(T_1+T_2)$ is reduced and the time required to hold ON the drive signal supplied to the laser light source 100 is rendered short, as shown in FIG. 10(b), whereby the quantity of light emitted from the laser beam emitting apparatus 1000 can be decrease.

Thus, the laser driving means 600 changes the time required to drive the drive signal supplied to the laser light source 100 to vary the duty ratio of the pulse thereof, thereby making it possible to adjust the quantity of light emitted from the laser beam emitting apparatus 1000.

Incidentally, the period of the pulse of the second drive signal is a few 100 KHz but may suitably be set.

Next, the description will be given below concerning an emission of a laser pulse and a rotating laser beam plane to be formed.

Figure 11A:
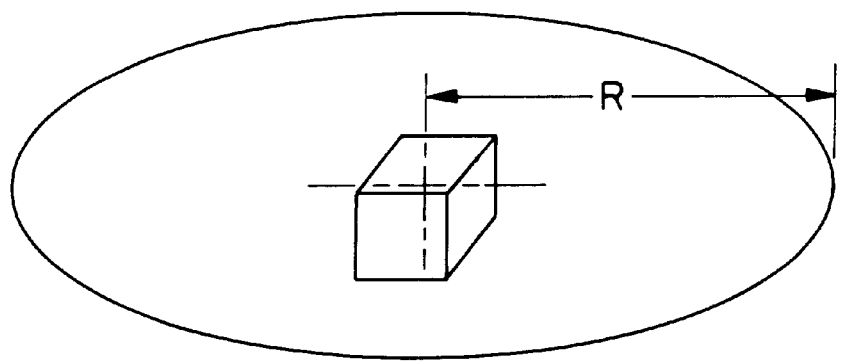
FIG. 11(a) is a diagram for describing a general irradiating method.
Figure 11B:
FIG. 11(b) is a diagram for describing a general irradiating method.

FIGS. 11(a) and 11(b) show an embodiment in which the laser beam emitting apparatus 1000 generates a continuous laser light beam, and a rotating laser beam plane is formed by launching out the laser light beam being rotated at the same time. At an irradiation position such as a wall which is away at a distance R from the laser beam irradiating apparatus 10000, as shown in FIG. 11(b), a band-shaped line turns out to be drawn. The band-shaped line in FIG. 11(b) means that the energy of the laser light is dispersed in a band-shaped manner in terms of time from the laser beam irradiating apparatus 10000, and as the distance R increases, the brightness of the band-shaped line decreases.

Figure 12A:
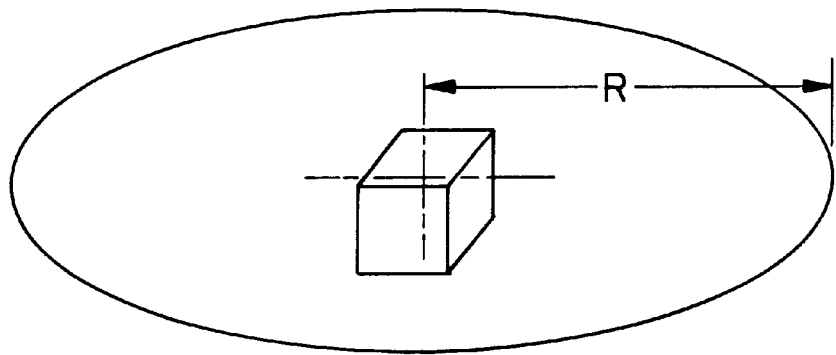
FIG. 12(a) is a diagram for describing an irradiating method according to the present invention.
Figure 12B:
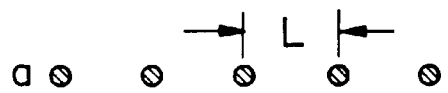
FIG. 12(b) is a diagram for describing an irradiating method according to the present invention.

Furthermore, FIGS. 12(a) and 12(b) show the principle of the present invention. At the irradiation position such as a wall which is away at a distance R from the laser beam irradiating apparatus 10000, as shown in FIG. 12(b), a cross section of the light beam is projected for every spacing L, and dot-shaped marks turn out to be drawn. The dot-shaped marks in FIG. 12(b) mean that the energy of the laser light is concentrated in a dot-shaped manner from the laser beam irradiating apparatus 10000, and even if the optical energy is equal, it is possible to draw a dot-shaped intermittent line with a high luminance.

Namely, in the present invention shown in FIG. 12(b), the energy dispersed on a line L in length is concentrated in a dot-shaped manner. This, even if the average output is equal, makes it possible to draw the dot-shaped intermittent line with a high luminance, thus tremendously increasing the visual recognition distance.

Also, if a pulse width of the pulse laser is so narrow as not to be substantially influenced by a scanning by a rotation of the laser beam irradiating apparatus 10000, the spacing L between two of the dot-shaped marks become longer as the distance R, which is a distance from the laser beam irradiating apparatus to the irradiation position such as a wall, gets longer. The brightness of the dot-shaped marks, however, turns out to be equal regardless of the distance R, thus eventually enabling the visual recognition distance to be lengthened.

Figure 13:
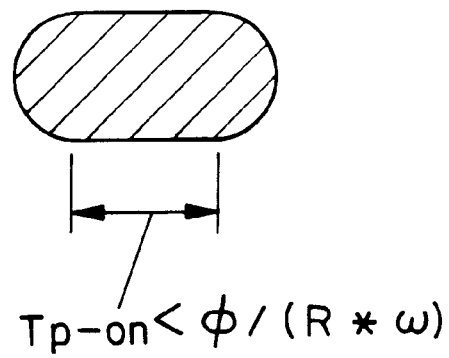
FIG. 13 is a diagram for showing an irradiated mark.

Referring to a condition for allowing the mark to look dot-shaped, the condition needs to be $$T_{p-on} < \phi/(R*\omega),$$

assuming that, as shown in FIG. 13, the light beam moves by a length of the diameter of the light beam during the emitting period, where $T_{p-on}$ designates an emitting time width of the pulse laser from the laser beam irradiating apparatus 10000, $\omega$ (omega) designates an angular velocity (rad/s), $\phi$ designates a cross section diameter of the light beam, and R designates a distance between the laser beam irradiating apparatus 10000 and an irradiated object.

For example, when selecting $\omega=20\pi$ (rad/s), R=80 m or more, and $\phi=5$ mm, $T_{p-on} = 1$ or less $\mu$s.

Meanwhile, concerning the plurality of marks formed on a wall by an irradiation from the laser beam irradiating apparatus 10000, a condition for allowing the marks to look intermittent, not continuous, needs to be $$\phi/(R*\omega) < T_{p-off},$$

where $T_{p-off}$ designates an extinguishing time of the pulse laser.

As shown in FIG. 1, in the present embodiment, the encoder 129 detects an angular velocity $\omega$ of the rotation supporter 13, thus inputting the data on the angular velocity into the control unit 118.

Referring to a condition for allowing each of the dot-shaped marks to be projected at the same position for every irradiation, the condition turns out to be $$\omega*T_{p-on-off} = 2*\pi*(m/n)$$

both m and n are integer), where $T_{p-on-off}$ designates an emitting time interval of the pulse laser.

The control unit 118 controls the angular velocity $\omega$ of the rotation supporter 13 so as to satisfy this condition. Namely, the control unit 118 controls and drives the scanning motor 15 through the motor controlling unit 120, thus performing PPL (PEASE LOCK LOOP) control so that the angular velocity of the rotation supporter 13 coincides with $\omega$.

The control unit 118, by controlling the motor controlling unit 120, makes it possible to synchronize an emission timing of the pulse laser with the rotation of the rotating unit 116, thus describing intermittent dot-shaped marks.

Figure 14:
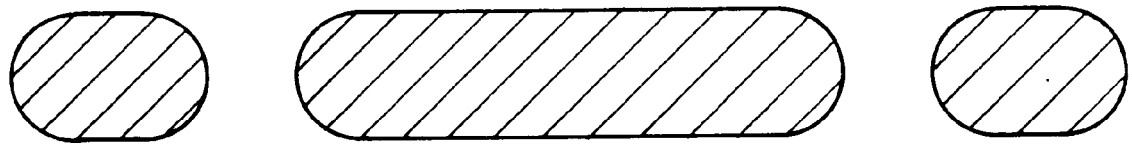
FIG. 14 is a diagram for showing an irradiated mark.

Incidentally, the shape of the mark is not limited to the shape illustrated in FIG. 13, and can be varied by changing the angular velocity $\omega$ and the emitting time width of the pulse laser $T_{p-on}$, depending on the situation and requirements as shown in FIG. 14.

Moreover, when the distance between the laser beam irradiating apparatus 10000 and an irradiated object is long, the spacing between the dot-shaped marks can be modified approximately by varying the angular velocity $\omega$ and the emitting time interval of the pulse laser $T_{p-on-off}$.

In the present invention configured above, a pulse driving means drives a pulse laser light source, and an irradiating means irradiates an irradiated object with a pulse laser light beam from the pulse laser light source, and a rotation driving means rotates the irradiating means, and a rotation detecting means detects the rotation of the irradiating means, and an arithmetic processing means, in accordance with a driving timing from the pulse driving means and a detection signal from the rotation detecting means, controls the rotation driving means to synchronize an emission timing of the pulse laser with the rotation of the irradiating means this makes it possible to concentrate dispersed optical energy in a dot-shaped manner, and, even if the average output is equal, makes it possible to draw a dot-shaped intermittent line with a high luminance, thus resulting in an effect of tremendously increasing the visual recognition distance.

Furthermore, in the present invention, the period T of the driving pulse driving means satisfies a condition $\tau_{FL} > T-\tau$ for $\tau_{FL}$ (life of fluorescence). This makes it possible to pump the optical resonator using a maximum intensity of laser light based on the first pulse, thus bringing about an effect of emitting a laser light with high efficiency.

What is claimed is:

1. A rotating laser beam irradiating apparatus, comprising:
   a pulse laser light source;
   a pulse driving means for driving the pulse laser light source;
   an irradiating means for irradiating an irradiated object with a pulse laser light beam from said pulse laser light source;
   a rotation driving means for rotating the irradiating means;
   a rotation detecting means for detecting the rotation of said irradiating means; and
   an arithmetic processing means which, in accordance with a driving timing from said pulse driving means and a detection signal from the rotation detecting means, controls said rotation driving means so as to synchronize an emission timing of said pulse laser with the rotation of said irradiating means.

2. A rotating laser beam irradiating apparatus as claimed in claim 1, wherein said pulse laser light source comprises an optical resonator composed of at least a laser crystal and an output mirror, and a pumping laser light source for pumping said optical resonator; and said pulse driving means is configured so as to drive the pumping laser light source.

3. A rotating laser beam irradiating apparatus as claimed in claim 1 or 2 wherein the period T of a driving pulse from said pulse driving means satisfies a condition: $\tau_{FL} > T-\tau$ for $T_{FL}$ (life of fluorescence).

(wherein $\tau$ designates the pulse width).

4. A rotating laser beam irradiating apparatus as claimed in claim 2 or 3, wherein inserted into said optical resonator is a nonlinear optical medium for generating secondary higher harmonics.

5. A rotating laser beam irradiating apparatus as claimed in any of claims 1 through 4, wherein said rotation driving means rotates the irradiating means so as to satisfy conditions:

$$T_{p\text{-}on} < \phi/(R*\omega)$$

$$\phi/(R*\omega) < T_{p\text{-}off},$$

where $T_{p\text{-}on}$ designates an emitting time width of the pulse laser source, $T_{p\text{-}off}$ designates an extinguishing time of the pulse laser source, $\omega(\text{rad/s})$ designates an angular velocity of the irradiating means, $\phi$ designates a cross section diameter of the pulse laser light beam, and R designates a distance from the rotating laser beam irradiating apparatus to an irradiated object.

6. A rotating laser beam irradiating apparatus as claimed in any of claims 1 through 5, wherein said rotation detecting means for detecting a rotation of the irradiating means is also provided with a function for detecting a direction in which a laser light is launched out.

* * * * *